(12) United States Patent
Morimoto et al.

(10) Patent No.: US 7,667,737 B2
(45) Date of Patent: Feb. 23, 2010

(54) VIDEO SIGNAL PROCESSING APPARATUS FOR GENERATING A VIDEO SIGNAL FROM OUTPUT OF A SOLID-STATE IMAGING ELEMENT AND DIGITAL CAMERA INCLUDING THE SAME

(75) Inventors: Mitsunori Morimoto, Nagano (JP); Takahiro Iwasawa, Kyoto (JP); Koujirou Yoneda, Osaka (JP); Kenji Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 510 days.

(21) Appl. No.: 11/528,684

(22) Filed: Sep. 28, 2006

(65) Prior Publication Data
US 2007/0070219 A1    Mar. 29, 2007

(30) Foreign Application Priority Data
Sep. 28, 2005    (JP)    ............................. 2005-281999

(51) Int. Cl.
*H04N 5/228*    (2006.01)
*H04N 5/217*    (2006.01)

(52) U.S. Cl. ..................... 348/222.1; 348/241; 348/312

(58) Field of Classification Search ........................ None
See application file for complete search history.

(56) References Cited

U.S. PATENT DOCUMENTS 5,663,759 A * 9/1997 Horng et al. ............. 348/222.1

6,593,966 B1 * 7/2003 Watanabe ................... 348/312
6,593,967 B1   7/2003 McGarvey et al.
6,963,368 B1 * 11/2005 Shibazaki .................... 348/241
2004/0201732 A1  10/2004 Kasuga et al.
2004/0263643 A1 * 12/2004 Imaizumi et al. ......... 348/222.1
2006/0022862 A1   2/2006 Egawa et al.

FOREIGN PATENT DOCUMENTS

EP    1 811 769 A    7/2007
JP    2003-153070 A    5/2003

OTHER PUBLICATIONS

European Search Report issued in European Patent Application No. EP 06 02 0425 dated Sep. 18, 2009.

* cited by examiner

*Primary Examiner*—Ngoc-Yen T Vu
(74) *Attorney, Agent, or Firm*—McDermott Will & Emery LLP

(57) ABSTRACT

In a video signal processing apparatus for generating a video signal in a prescribed format by capturing output of a solid-state imaging element that is driven by corresponding to each timing of horizontal scanning and vertical scanning, a first signal processing circuit generates a first video signal by performing the first signal processing on an analog video signal that is continuously outputted from the solid-state imaging element by a horizontal-line unit. An A/D converter circuit generates the first video data by converting the first video signal to digital information. A memory circuit stores the first video data at least by one horizontal-line unit, and reads out the first video data with a delay of a prescribed delay period. A second signal processing circuit generates the second video data by performing the second signal processing on the first video data that is read out from the memory circuit.

5 Claims, 7 Drawing Sheets

VIDEO SIGNAL PROCESSING APPARATUS FOR GENERATING A VIDEO SIGNAL FROM OUTPUT OF A SOLID-STATE IMAGING ELEMENT AND DIGITAL CAMERA INCLUDING THE SAME

BACKGROUND OF THE INVENTION

1. Field of the Invention

The present invention relates to a video signal processing apparatus that converts video signals obtained form a solid-state imaging element into digital data and performs various kinds of signal processing. Moreover, the present invention relates to a digital camera constituted with such video signal processing apparatus and solid-state imaging element.

2. Description of the Related Art

Recently, there have been achieved single-chip MOS cameras, owing to a rapid advancement in the digital signal processing technique and CMOS (Complementary Metal Oxide Semiconductor) micronization technology. In a single-chip MOS camera, there are integrated, on a single silicon substrate, a video signal processing apparatus capable of performing high-grade signal processing and an imaging element that picks up optical signals irradiated to the imaging plane by converting them into electric signals.

While it has become possible to provide the single-chip cameras, there has been found that a two-chip structure, in which an imaging chip and a video signal processing chip are formed individually, is advantageous in terms of the performance and the cost.

The video signal processing chip processes vast amount of digital image information at a high speed. Thus, the ratio of the signal processing function among the function of the video signal processing chip increases more and more. Further, a large amount of compression is required on the image information for transmitting still images through portable telephones that are expected to advance more drastically in the future. JPEG (Joint Photographic Experts Group) is known as a method for compressing the image data. In this data compression method, it is necessary to perform a large amount of calculations at a high speed. In order to fabricate the signal processing chips for performing this processing, the latest CMOS micronization technology and CMOS designing technique are essential. Furthermore, an ultrahigh-speed processing circuit is necessary for handling dynamic pictures. Therefore, the state-of-the-art technology of the digital CMOS micronization is required for fabricating the video signal processing chips.

Meanwhile, the imaging chip deals with analog signals, and it differs from the video signal processing chip in this respect. Furthermore, a drastic micronization of the imaging chips is difficult due to a restriction in a photosensitive area such as a lens used in a camera.

Due to the difference described above, the manufacturing processes required for the imaging chips and the video signal processing chips are different. Therefore, if the both chips are forcibly made into a single chip, there may generate a noise and induce deterioration in the imaging performance. In other words, it leads to a high price and poor performance if both chips are forcibly formed into a single chip. Considering those aspects, it has recently been investigated to design the imaging chip and the video signal processing chip individually, when forming the video signal processing chip and the imaging chip into a single chip.

For example, the related art disclosed in US 2004/0201732 comprises a chip set that is a combination of a video signal processing chip constituted with a CMOS and an imaging chip constituted with a transistor in a low-leak current structure formed only with an nMOS type or pMOS type, wherein a timing pulse generating circuit, a gain control amplifier, and an A/D converter circuit are mounted on the video signal processing chip to achieve the low cost. Furthermore, all the circuits of the imaging chip that is designed individually are formed with only the nMOS type or the pMOS type. Thus, only a single kinds of well structures need to be formed in a process diffusion step, so that the number of process steps and the masks can be reduced dramatically. Moreover, it is unnecessary to employ a micronization process in accordance with the video signal processing apparatus, and the imaging chip can be designed separately from the video signal processing apparatus by placing emphasis on the analog performance. Therefore, it is unnecessary to perform forcible micronization process, which results in achieving high performance.

In the above-described related art, however, the analog signal processing circuit is mounted on the video signal processing chip. Thus, the analog signal processing system and the digital signal processing system are mixed within a single video signal processing chip. In that case, the analog signal processing part constituted with the analog signal processing circuit, the AD-converter circuit, etc. and the digital signal processing part are arranged closely within the video signal processing chip, no matter how the circuit layout, and the separation of the power source and ground circuit are contrived. Therefore, it is not possible to prevent the digital noise generated at the time of performing digital signal processing from being mixed into the analog signals.

In the followings, the driving timing of the video signal processing apparatus according to the above-described related art will be described. FIG. 6 is an example of a block diagram for showing the video signal processing apparatus, and FIG. 7 is an example for showing each of the action timings of the signal processing according to the related art.

First, a camera-control microcomputer 16 comprising the timing generating circuit supplies, to a solid-state imaging element 11, a drive control signal S11 containing a horizontal synchronizing signal from a timing supply line for controlling drive in the horizontal direction, a vertical synchronizing signal for controlling drive in the vertical direction, and a pulse for driving the imaging element. A synchronized input video signal S12 is inputted as an analog signal from the solid-state imaging element 11 to a video signal processing apparatus 20. The input video signal S12 is continued by a single horizontal line unit, and a video period as an effective video pixel region containing an optically black part and a horizontal blanking period as a retrace blanking period of the horizontal scanning are set in each of the signals in the horizontal line. The input video signal S12 inputted to the video signal processing apparatus 20 is first captured into the analog signal processing circuit 12 where the analog signal processing is applied, which is then captured into the A/D converter circuit 13 as a video signal S13. The video signal S13 is converted to digital video data S14 by the A/D converter circuit 13, and written to a line memory 14. The video data S14 written to the line memory 14 is outputted in that timing to a digital signal processing circuit 15 as video data S15. The video data S15 receives digital signal processing in the digital signal processing circuit 15, which is then outputted from the video signal processing apparatus 20 as output video data S16.

As shown in FIG. 7, in the video signal processing apparatus 20 of the above-described related art, there exists an overlap period where the analog signal processing period and the digital signal processing period overlap with each other. Therefore, there is such a risk that the digital noise generated at the time of performing digital signal processing may be mixed into the analog signal in the overlap signal processing period.

SUMMARY OF THE INVENTION

The main object of the present invention therefore is to effectively prevent the mixture of the digital noise to the analog signals in a video signal processing apparatus which comprises an analog signal processing circuit such as an analog signal processing circuit and an A/D converter circuit, and a digital signal processing circuit mounted in a mixed manner.

In order to overcome the foregoing shortcomings, the video signal processing apparatus of the present invention is a video signal processing apparatus which generates a video signal in a prescribed format by capturing output of a solid-state imaging element that is driven by corresponding to each timing of horizontal scanning and vertical scanning. The processing apparatus comprises: a first signal processing circuit for generating a first video signal by performing first signal processing on an analog video signal that is continuously outputted from the solid-state imaging element by a horizontal-line unit; an A/D converter circuit for generating first video data by converting the first video signal to digital information; a memory circuit which stores the first video data at least by one horizontal-line unit, and reads out the first video data with a delay of a prescribed delay period; and a second signal processing circuit for generating second video data by performing second signal processing on the first video data that is read out from the memory circuit.

In this structure, the first video data is generated in the first signal processing circuit and the A/D converter circuit, and it is stored in the memory circuit. The stored first video data is outputted to the second signal processing circuit to generate the second video data from the first video data stored in the memory circuit. The memory circuit has a function of shifting (delaying) the period of outputting the stored first video data to the second signal processing circuit with respect to the period of generating and storing the first video data. In other words, it shifts (delays) the digital signal processing period where the first video data is read out from the memory circuit and the second video data is generated in the second signal processing with respect to the analog signal processing period where the first video data is generated in the first signal processing circuit and the A/D converter circuit and storing it to the memory circuit. In short, the analog signal processing period is shifted from the digital signal processing period. Even if a digital noise is generated in the process of generating the second video data from the first video data in the second signal processing circuit, the first signal processing as the analog signal processing has already been completed by that period. Even if the periods overlap with each other partially, the overlapped part is basically insignificant. As a result, even if there is a digital noise, a risk of mixing the digital noise into the first analog signal processing can be eliminated as much as possible. With this, deterioration of the picture quality can be suppressed.

In the above-described structure, it is desirable that the memory circuit set the delay period in such a manner that a processing period where the first signal processing is performed on the analog video signal does not overlap with a processing period where the second signal processing is performed on the first video data. With this, the first signal processing period does not overlap with the second signal processing period at all, so that there is completely no risk of mixing the digital noise generated in the second signal processing into the first signal processing. Thereby, effect of suppressing the deterioration of the picture quality can be improved further.

In the above-described structure, it is desirable that the second signal processing circuit adjust a frequency of a clock pulse in the processing period of the second signal processing so that the second signal processing can be completed within an interval period between two sets of the adjacent first signal processing. This is one of the measures taken so that the period of the first signal processing does not overlap with the period of the second signal processing. To set the start timing of the second signal processing to be after the end point of the period of the first signal processing is one of the conditions for preventing the overlap. However, if the end timing of the second signal processing is later than the start point of the period of the first signal processing in the next cycle, the digital noise generated in the second half of the second signal processing period may be mixed into the first half of the first signal processing period. Thus, the second signal processing is completed before the start of the first signal processing period through performing high-speed processing by increasing the frequency of the clock pulse when the second signal processing circuit performs the second signal processing. With this, the first signal processing period does not overlap with the second signal processing period at all. As a result, mixture of the digital noise can be prevented surely.

In the above-described structure, it is desirable that the second signal processing circuit set the start timing of the processing period of the second signal processing to be after the end timing of the processing period of the first signal processing, and set a cycle of a horizontal synchronizing signal in action to be a length of time that is longer than a sum of the processing period of the first signal processing and the processing period of the second signal processing. This is also one of the measures taken so that the period of the first signal processing does not overlap with the period of the second signal processing. In this case, the first signal processing period does not overlap at all with the second signal processing period, either. As a result, mixture of the digital noise can be prevented surely.

Furthermore, in the above-described structure, both of the circuits for executing those two kinds of processing may be mounted for enabling each of the functions selectively or in combination in order to execute a plurality of kinds of measures (increasing the speed of the clock pulse, adjusting the length of the cycle of the horizontal synchronizing signal, etc.) so that the first signal processing period does not overlap with the second signal processing period. Thereby, it becomes possible to perform the optimum processing method in accordance with the filming circumstances. As a result, the effect for suppressing the quality deterioration can be improved further.

Moreover, the digital camera according to the present invention is constituted with: any of the video signal processing apparatuses described above; and a solid-state imaging element driven and timing-controlled by a drive control signal outputted from the video signal processing apparatus, which generates an analog video signal of a subject and sends it out as an input video signal to the video signal processing apparatus. With this, it is possible to pick up images of good quality by suppressing mixture of digital noises.

The present invention is capable of suppressing the deterioration of the picture quality by avoiding the mixture of the digital noise through not performing the first signal processing in the period of performing the second signal processing.

The video signal processing apparatus according to the present invention is effective as a digital camera and the like, in which there is no mixture of the digital noise, and deterioration of the picture quality is suppressed.

BRIEF DESCRIPTION OF THE DRAWINGS

Other objects of the present invention will become clear from the following description of the preferred embodiments and the appended claims. Those skilled in the art will appreciate that there are many other advantages of the present invention possible by embodying the present invention.

DETAILED DESCRIPTION OF THE INVENTION

Figure 1:
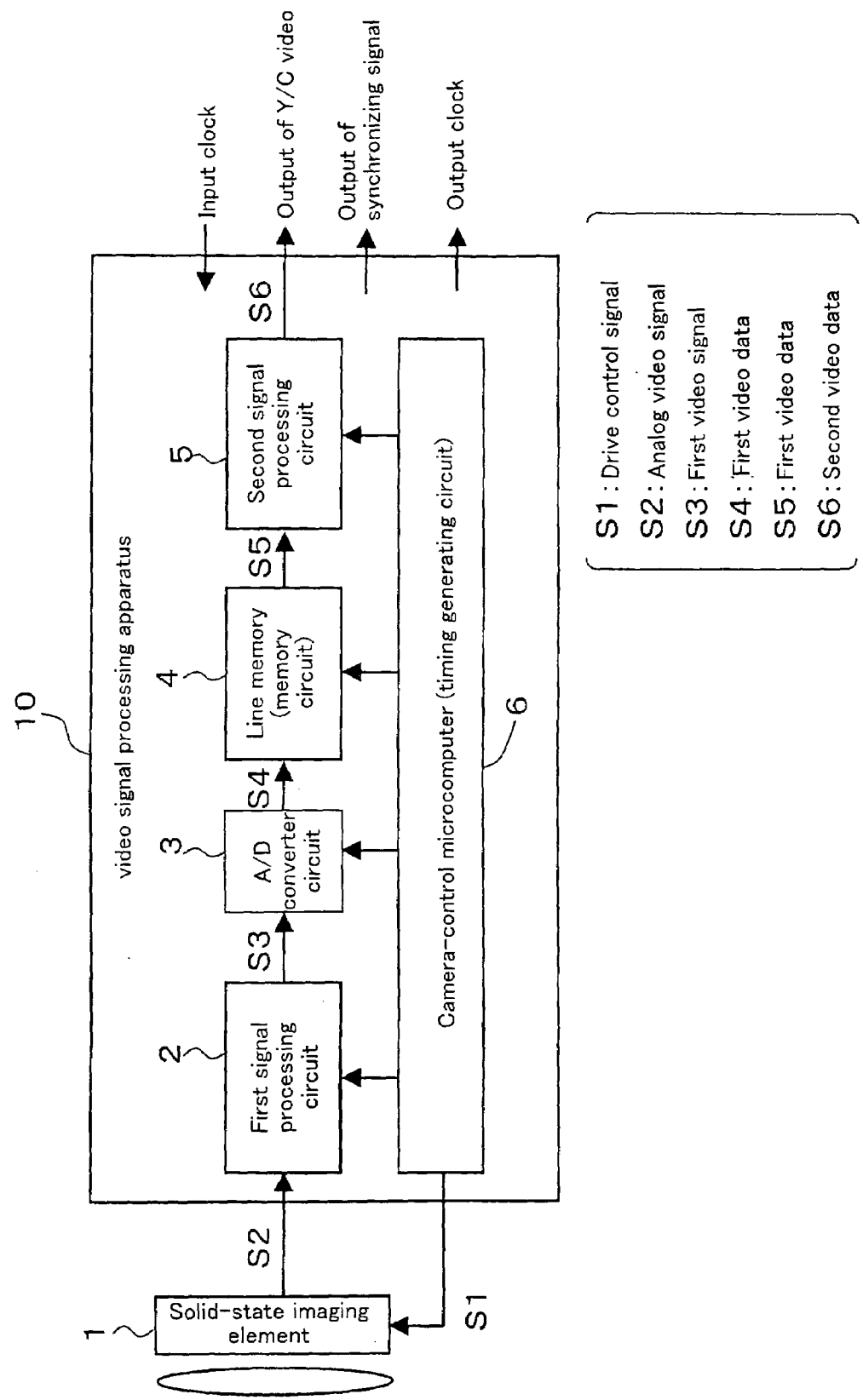
FIG. 1 is a block diagram for showing the structure of a digital camera that comprises a video signal processing apparatus according to an embodiment of the present invention.

In the followings, an embodiment of a digital camera that comprises a video signal processing apparatus of the present invention will be described in detail by referring to the accompanying drawings. FIG. 1 is a block diagram for showing the structure of the digital camera that comprises a video signal processing apparatus according to the embodiment of the present invention. In FIG. 1, a video signal processing apparatus 10 captures an analog signal S12 outputted from a solid-state imaging element 1, and generates a second video data S6 through performing analog signal processing, A/D conversion, and digital signal processing.

The video signal processing apparatus 10 comprises a first signal processing circuit 2 for performing analog signal processing, an A/D converter circuit 3, a line memory 4 as a memory circuit, a second signal circuit 5 for performing digital signal processing, and a camera-control microcomputer 6.

The first signal processing circuit 2 performs analog signal processing by capturing an analog video signal S2 outputted from the solid-state imaging element 1 to generate a first video signal S3 in a prescribed format. The analog signal processing includes correlation double sampling (CDS) processing and automatic gain control (AGC) processing. The correlation double sampling (CDS) processing eliminates the reset noise and 1/f noise generated at the time of transferring the electric charge in the solid-state element 1, and generates the video signal with no black-level fluctuation and lateral noise. The automatic gain control (AGC) processing adjusts the gain of the output video signal of the CDS circuit. The analog signal processing is referred to as the first signal processing hereinafter.

The A/D converter circuit 3 captures and converts the first video signal S3 to generate first video data S4 having each datum therein corresponds to the video information of each light-receiving pixel of the solid-state imaging element. The line memory 4 stores, by a horizontal line unit, the first video data S4 generated in the A/D converter 3, and reads out and outputs first video data S5 stored therein after a prescribed period has passed, according to an instruction from the camera-control microcomputer 6. The readout timing will be described later in detail.

The second signal processing circuit 5 performs digital signal processing by capturing the first video data S5 outputted from the line memory 4 to generate second video data (Y/C video data) S6 in a prescribed format. The digital signal processing is referred to as the second signal processing hereinafter.

The timing for reading out the first video data S5 from the line memory 4 is set at the timing where all the first video data S4 in one horizontal line have been written to the line memory 4. Further, the speed of the clock pulse is set to increase when performing the signal processing in the second signal processing circuit 5, so that the processing time of the digital signal processing system (the second signal processing system), i.e. the period from the output of the first video data S5 from the line memory 4 until the output of the first video data S5 from the second signal processing circuit 5, is completed within the horizontal blanking period.

That is, it is so set that the video signal processing period of the analog signal processing system (the first signal processing system), i.e. the period from the output of the analog video signal S2 from the solid-state imaging element 1 until writing of the first video data S4 to the line memory 4, does not overlap with the video signal processing period of the digital signal processing system (the second signal processing system). With this, the signal processing period of the analog signal processing system (the first signal processing system) and the signal processing period of the digital signal processing system (the second signal processing system) do not overlap with each other. This prevents mixture of the digital noise generated in the digital signal processing system (the second signal processing system) into the first video signal S3 and the first video data S4.

Figure 2:
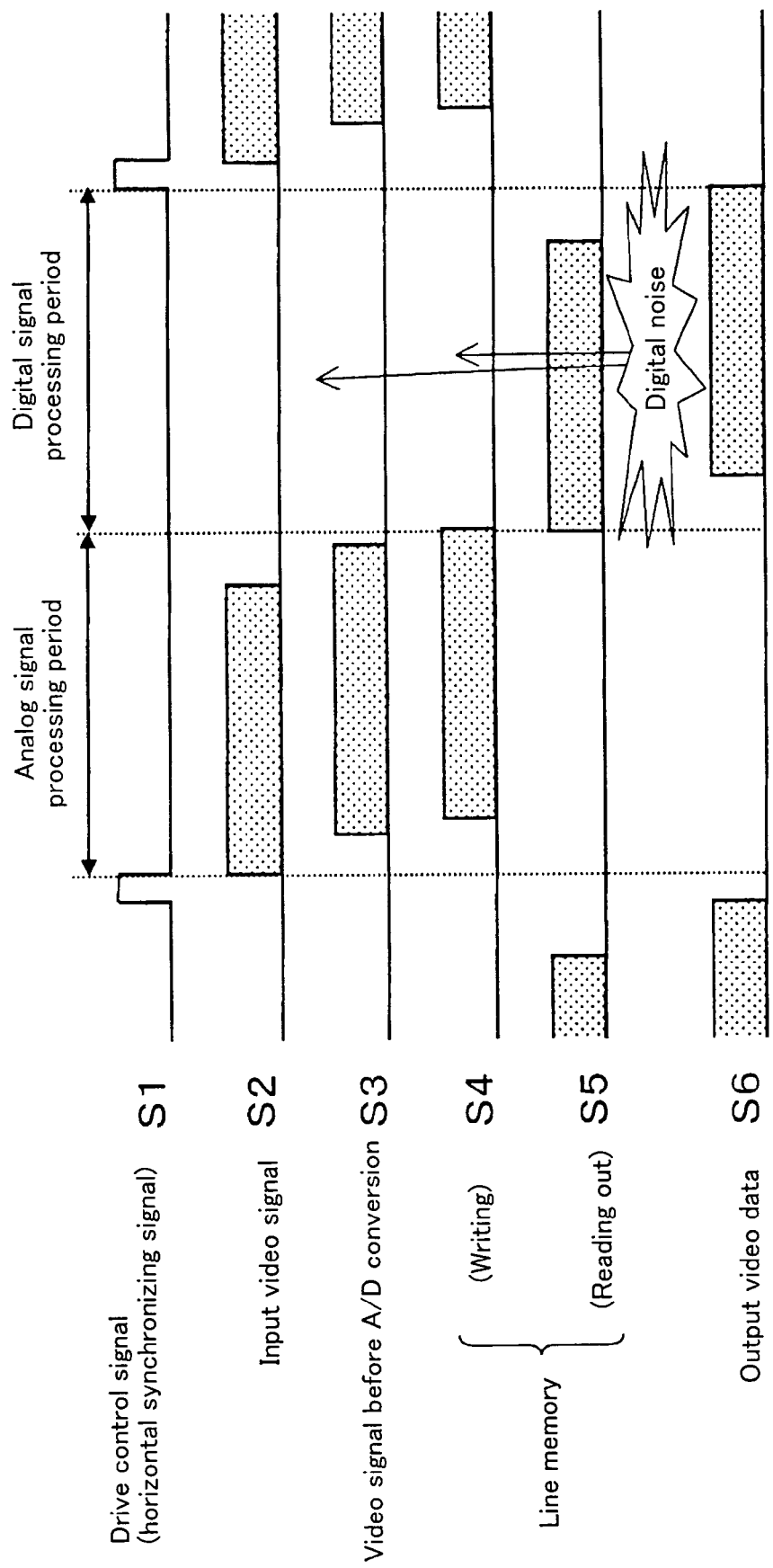
FIG. 2 is a timing chart for showing the action of the video signal processing apparatus according to the embodiment of the present invention.

FIG. 2 is a timing chart for showing an example of each of the action timings of the video signal processing according to the embodiment. First, the camera-control microcomputer 6 that comprises the timing generating circuit supplies, to the solid-state imaging element 1, a drive control signal S11 containing a horizontal synchronizing signal from a timing supply line for controlling drive in the horizontal direction, a vertical synchronizing signal for controlling drive in the vertical direction, and a pulse for driving the imaging element. A synchronized analog input video signal S2 is inputted from the solid-state imaging element 1 to the video signal processing apparatus 10. The input video signal S2 is captured first into the analog signal processing circuit 2 and receives the first signal processing (analog signal processing) therein, which is then captured into the A/D converter circuit 3 as the first video signal S3. The first video signal S3 is converted to the first digital video data S4 by the A/D converter circuit 3, and inputted to the line memory 4. The line memory 4 accumulates the first video data S4 until writing of all the first video data S4 in one horizontal line is completed. At the timing where writing of all the first video data S4 is completed, the processing is started to read out the accumulated first video data S4 to the second signal processing circuit 5. The first video data S5 receives the second signal processing (the digital signal processing) in the second signal processing circuit 5, which is then outputted from the video signal processing apparatus 10 as the output video data S6.

Figure 3:
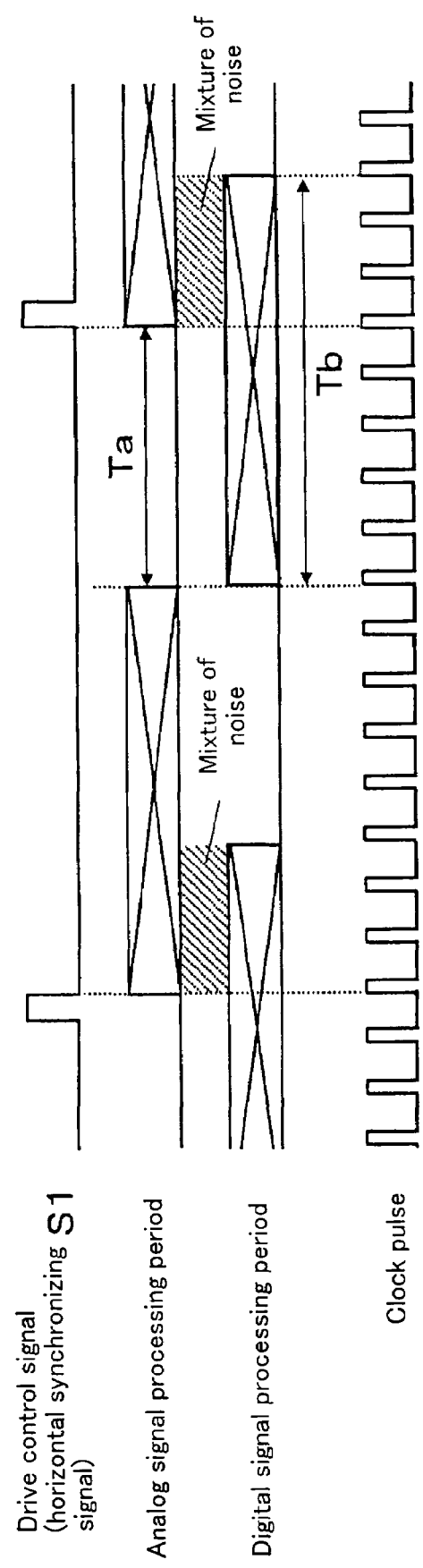
FIG. 3 is a timing chart for describing mixture of the digital noises in the embodiment of the present invention.

At that time, as shown in FIG. 3, when the period where the first signal processing (the analog signal processing) is not in action, i.e. the interval period Ta between the first signal processing periods adjacent to each other, is equal or longer than the period Tb where the second signal processing (the digital signal processing) is performed in the video period of one horizontal line (Ta≧Tb), the timing of the period Tb in the line memory 4 may simply be shifted. With this, the delayed period Tb does not overlap with the one-horizontal-line video period of the input video signal that is inputted next. In that case, however, it is necessary to set the delay time of the period Tb to be longer than the length of the time where the period Tb and the one-horizontal-line video period of the input video signal that is inputted next overlap with each other (for example, the length of time equivalent to the interval period Ta).

However, when the interval period Ta is shorter than the period Tb (Ta<Tb), it is not possible by simply shifting the timing of the period Tb in the line memory 4 to avoid overlap of the delayed period Tb with the one-horizontal-line video period of the input video signal that is inputted next.

Figure 4:
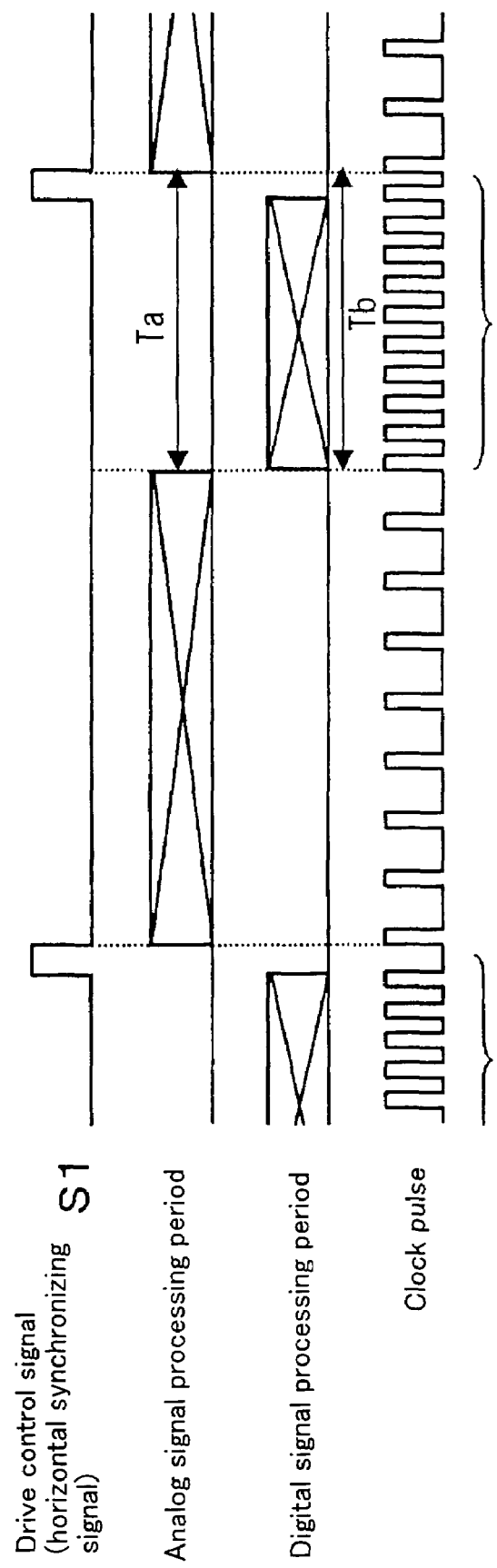
FIG. 4 is a timing chart for showing changes in the speed of the clock pulse in the embodiment of the present invention.

In order to overcome such inconvenience, the embodiment increases, as the first processing, the speed of the clock pulse of the video signal processing apparatus 10 at the timing where it is started to read out the first video data S5 from the line memory 4 to the second signal processing circuit 5 as shown in FIG. 4. In other words, the frequency of the clock pulse is increased than the normal state. In this case, the frequency of the clock pulse of the video signal processing apparatus 10 is increased to an extent with which the second signal processing (the digital signal processing) of the one-horizontal-line video period can be completed within a period where the first signal processing (the analog signal processing) is not in action. The camera-control microcomputer 6 controls the frequency of the clock pulse. With this, the period of performing the second signal processing (the digital signal processing) can be shortened. This enables the second signal processing (the digital signal processing) of the one-horizontal-line video period to be completed within the interval period Tb that is from the end of the first signal processing (the analog signal processing) of one-horizontal-line video period until the start of the first signal processing (the analog signal processing) of the next one-horizontal-line video period.

Figure 5:
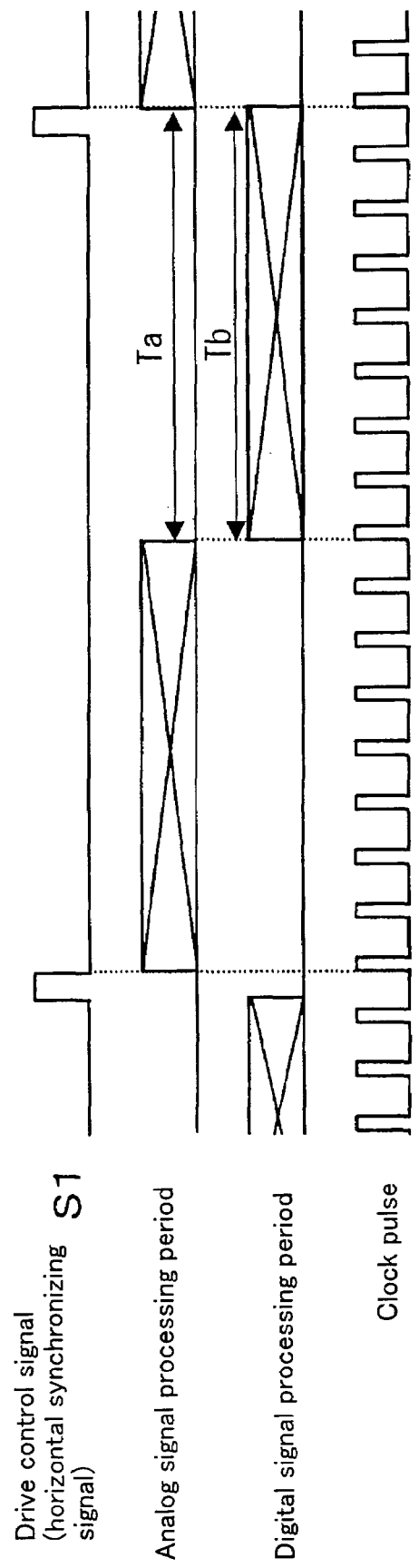
FIG. 5 is a timing chart for showing changes in the cycle of a horizontal synchronizing signal according to the embodiment of the present invention.
Figure 6:
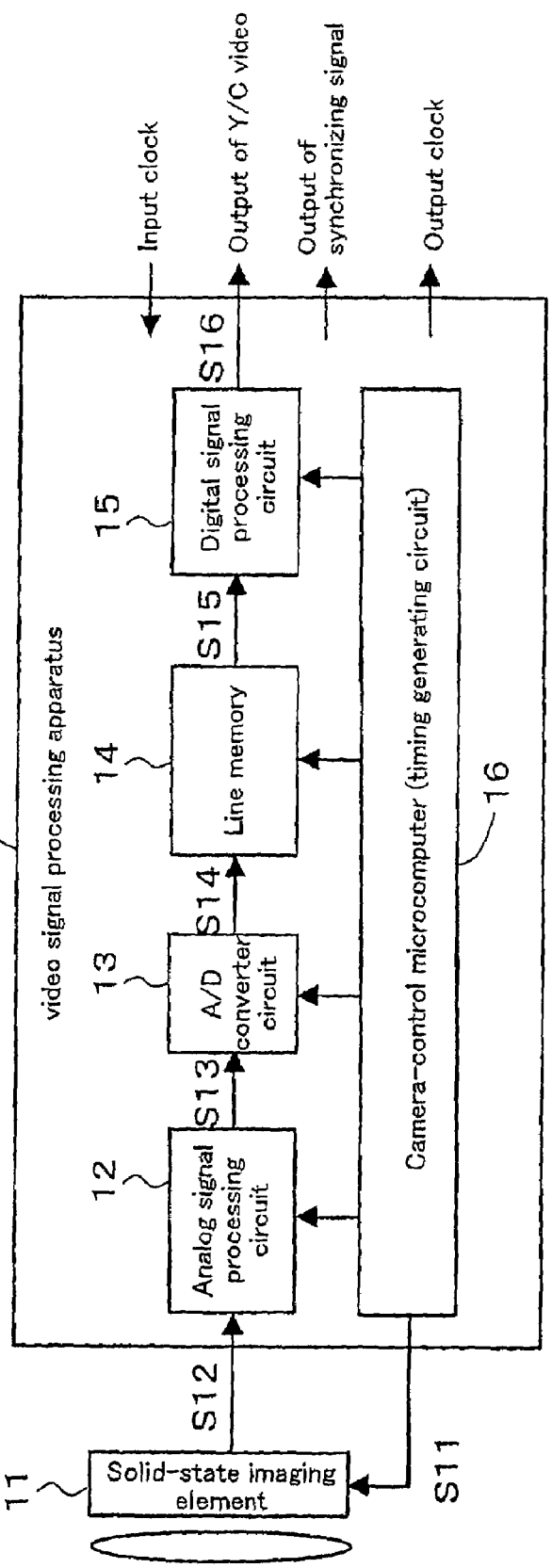
FIG. 6 is a block diagram for showing the structure of a digital camera that comprises a video signal processing apparatus according to a related art.
Figure 7:
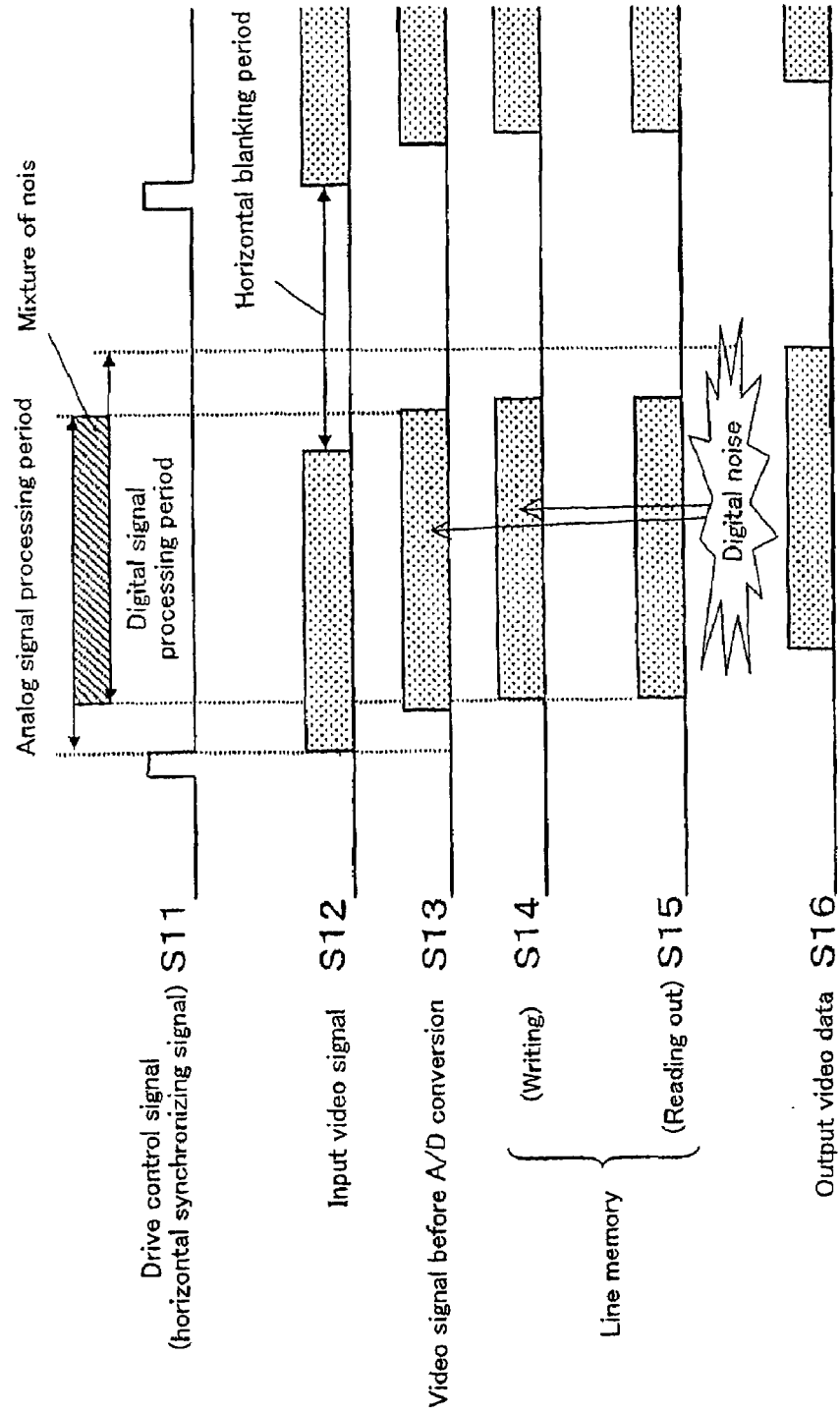
FIG. 7 is a timing chart for showing the action of the video signal processing apparatus according to the related art.

As the second processing, the embodiment expands the signal width (cycle) of the horizontal synchronizing signal of the solid-state imaging element 1 at the timing where it is started to read out the first video data S5 from the line memory 4 to the second signal processing circuit 5 as shown in FIG. 5. The signal width (cycle) of the horizontal synchronizing signal is set as the length of time that is longer than the sum of the period where the signal processing of the first signal processing system (the analog signal processing system) is performed and the period where the second signal processing system (the digital signal processing system) is performed. Specifically, the cycle of the horizontal synchronizing signal in action is set to be longer than the sum of the processing period of the first signal processing and the processing period of the second signal processing. The camera-control microcomputer 6 performs the control of the cycle of the horizontal synchronizing signal. With this, like the first measure taken above, the period of performing the second signal processing (the digital signal processing) can be shortened. This enables the second signal processing (the digital signal processing) of the one-horizontal-line video period to be completed within the interval period Ta that is from the end of the first signal processing (the analog signal processing) of one-horizontal-line video period until the start of the first signal processing (the analog signal processing) of the next one-horizontal-line video period.

Needless to say, the two types of processing may be executed in combination if the second signal processing (the digital signal processing) of one-horizontal-line video period cannot be completed by executing only either the first or the second processing (the processing for adjusting the frequency of the clock pulse or the processing for adjusting the period of the horizontal synchronizing signal). For example, there are cases where it is not possible to expand the signal width (cycle) of the horizontal synchronizing, depending on the frame rate of the dynamic picture. Similarly, there are cases where it is not possible to increase the frequency to increase the speed of the clock pulse due to the performance of the digital signal processing. In such cases, both of the circuits for executing the first and second processing described above may be mounted, and either processing may be executed selectively. With this, it becomes possible to perform the optimum control-signal correcting processing in accordance with the filming circumstances. Therefore, the effect for suppressing the quality deterioration can be improved further.

Through taking either of the measures described above, it is possible with the embodiment to separate the first signal processing (the analog signal processing) period and the second signal processing (the digital signal processing) period from each other in terms of the processing timing. Therefore, mixture of the digital noise into the analog video signal can be prevented effectively.

The present invention has been described in detail by referring to the most preferred embodiments. However, various combinations and modifications of the components are possible without departing from the spirit and the broad scope of the appended claims.

What is claimed is:

1. A video signal processing apparatus which generates a video signal in a prescribed format by capturing output of a solid-state imaging element that is driven by corresponding to each timing of horizontal scanning and vertical scanning, said processing apparatus comprising:
    a first signal processing circuit for generating a first video signal by performing first signal processing on an analog video signal that is continuously outputted from said solid-state imaging element by a horizontal-line unit;
    an A/D converter circuit for generating first video data by converting said first video signal to digital information;
    a memory circuit which stores said first video data at least by one horizontal-line unit, and reads out said first video data with a delay of a prescribed delay period; and
    a second signal processing circuit for generating second video data by performing second signal processing on said first video data that is read out from said memory circuit;
    a first control circuit for changing an operating frequency of said second signal processing circuit; wherein
    said first control circuit is configured to increase said operating frequency of said second signal processing circuit in a second signal processing period so that said second signal processing is completed within an interval period between processing periods of said analog video signal.

2. The video signal processing apparatus according to claim 1, wherein said memory circuit sets said delay period in such a manner that a processing period where said first signal processing is performed on said analog video signal does not overlap with a processing period where said second signal processing is performed on said first video data.

3. The video signal processing apparatus according to claim 1, further comprising a second control circuit for supplying a horizontal synchronizing signal to said solid-state imaging element,
    wherein said second control circuit sets start timing of said processing period of said second signal processing to be after end timing of a processing period of said first signal processing, and sets a cycle of a horizontal synchronizing signal in action to be a length of time that is longer than a sum of said processing period of said first signal processing and said processing period of said second signal processing.

4. The video signal processing apparatus according to claim 1, wherein all of said first signal processing circuit, said A/D converter circuit, said memory circuit, said second signal processing circuit and said first control circuit are disposed on a single-chip LSI.

5. A digital camera, comprising:

said video signal processing apparatus according to claim 1; and a solid-state imaging element driven and timing-controlled by a drive control signal outputted from said video signal processing apparatus, which generates an analog video signal of a subject and sends it out as an input video signal to said video signal processing apparatus.

* * * * *

UNITED STATES PATENT AND TRADEMARK OFFICE
CERTIFICATE OF CORRECTION

| | | |
|---|---|---|
| PATENT NO. | : 7,667,737 B2 | Page 1 of 1 |
| APPLICATION NO. | : 11/528684 | |
| DATED | : February 23, 2010 | |
| INVENTOR(S) | : Morimoto et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 652 days.

Signed and Sealed this

Seventh Day of December, 2010

David J. Kappos
*Director of the United States Patent and Trademark Office*